United States Patent
Priyanto et al.

(10) Patent No.: US 12,422,515 B2
(45) Date of Patent: Sep. 23, 2025

(54) METHODS FOR POSITIONING OF A WIRELESS DEVICE, A RELATED WIRELESS DEVICE AND A RELATED NETWORK NODE

(71) Applicant: Sony Group Corporation, Tokyo (JP)

(72) Inventors: Basuki Priyanto, Lund (SE); Jose Flordelis, Lund (SE); Johan Hill, Lund (SE)

(73) Assignee: Sony Group Corporation, Tokyo (JP)

( * ) Notice: Subject to any disclaimer, the term of this patent is extended or adjusted under 35 U.S.C. 154(b) by 582 days.

(21) Appl. No.: 17/796,097

(22) PCT Filed: Jan. 27, 2021

(86) PCT No.: PCT/EP2021/051877
§ 371 (c)(1),
(2) Date: Jul. 28, 2022

(87) PCT Pub. No.: WO2021/160434
PCT Pub. Date: Aug. 19, 2021

(65) Prior Publication Data
US 2023/0056394 A1 Feb. 23, 2023

(30) Foreign Application Priority Data
Feb. 13, 2020 (SE) .................... 2050156-5

(51) Int. Cl.
*G01S 5/00* (2006.01)
*H04W 64/00* (2009.01)

(52) U.S. Cl.
CPC ........... *G01S 5/0036* (2013.01); *H04W 64/00* (2013.01); *G01S 2205/007* (2013.01)

(58) Field of Classification Search
CPC ............ G01S 2205/007; G01S 5/0036; G01S 5/0218; H04W 64/00
See application file for complete search history.

(56) References Cited

U.S. PATENT DOCUMENTS

| | | |
|---|---|---|
| 2012/0162012 A1 | 6/2012 | Marzouki et al. |
| 2014/0087754 A1 | 3/2014 | Siomina et al. |
| (Continued) | | |

FOREIGN PATENT DOCUMENTS

| | | |
|---|---|---|
| WO | 2017164925 A1 | 9/2017 |
| WO | 2018029663 A1 | 2/2018 |
| WO | 2018083610 A1 | 5/2018 |

OTHER PUBLICATIONS

International Search Report and Written Opinion from corresponding International Application No. PCT/EP2021/051877, mailed on Apr. 30, 2021, 10 pages.
(Continued)

*Primary Examiner* — Nader Bolourchi
(74) *Attorney, Agent, or Firm* — Tucker Ellis LLP

(57) ABSTRACT

A method is disclosed, performed by a first wireless node, such as a wireless device, for enabling positioning of the wireless device. The method comprises providing, to a network node, a measurement report comprising a positioning measurement based on one or more reference signals transmitted from one or more second wireless nodes, such as base stations. The measurement report comprises an indication as to whether the positioning measurement is performed on a Line of Sight, LoS, component of the one or more reference signals.

19 Claims, 9 Drawing Sheets

(56) References Cited

U.S. PATENT DOCUMENTS

| | | |
|---|---|---|
| 2015/0382318 A1 | 12/2015 | Kim et al. |
| 2017/0150436 A1 | 5/2017 | Modarres Razavi et al. |
| 2019/0361111 A1 | 11/2019 | Sadiq et al. |
| 2020/0217918 A1* | 7/2020 | Rydén .................. H04W 4/029 |

OTHER PUBLICATIONS

Office Action and Search Report from corresponding Swedish Application No. 2050156-5, mailed on Dec. 21, 2020, 9 pages.

* cited by examiner

METHODS FOR POSITIONING OF A WIRELESS DEVICE, A RELATED WIRELESS DEVICE AND A RELATED NETWORK NODE

The present disclosure pertains to the field of wireless communications. The present disclosure relates to methods for positioning of a wireless device, a related wireless device and a related network node.

BACKGROUND

Positioning is an important feature of the $3^{rd}$ Generation Partnership Project (3GPP) Fifth Generation (5G) New Radio (NR), targeting high accuracy positioning of wireless devices. Positioning in 5G NR is designed to support indoor factory deployments that require high accuracy positioning of objects for localization and automation purposes. For example, on a factory floor, it may be beneficial to locate assets and moving objects such as forklifts, or parts to be assembled. Similar needs exist in for example transportation and logistics.

To address the higher accuracy location requirements resulting from new applications and industry verticals, positioning in 5G NR should meet the following exemplary performance targets:

(a) For general commercial use cases (e.g. 3GPP TS 22.261 v.16.7.0):
  sub-meter level position accuracy (<1 m)
(b) For Industrial Internet of Things (IIoT) Use Cases (e.g. 3GPP TS 22.804 v.16.2.0):
  position accuracy <0.2 m The target latency requirement for the positioning should be <100 ms. For some Internet-of-Things (IoT) use cases however, a latency in the order of 10 ms may be desired.

Indoor factory deployments may however have many metal objects located in a transmission path between a base station and a wireless device, which may cause a generation of many Non-Line of Sight (NLoS) components of radio signals transmitted from one or more base stations. A Line of Sight (LoS) component of a radio signal may herein be understood as a component of a radio signal transmitted to the wireless device either in a straight path free of any form of obstruction, or as a radio signal transmitted in a straight path to the wireless device through an obstructing material, but leaving sufficient transmission for radio waves to be detected. A NLoS component of a radio signal on the other hand is a component of the transmitted radio signals that is not a LoS component, i.e. a component that is not directly transmitted from the base station to the wireless device but is propagated and reflected by external objects, such as e.g. metal objects in the indoor factory deployment. Typically, NLoS components arise from reflections of the radio signals on scattering objects located in the propagation environment.

An issue in an indoor deployment scenario is the existence of multipath components. Multipath is a propagation phenomenon resulting in a radio signal reaching a receiving antenna, such as an antenna of the wireless device in Downlink (DL) or an antenna of a base station in Uplink (UL), by two or more paths and may be caused by reflection of the transmitted signal from external objects. The transmitted radio signal may be received by the wireless device as a LoS component. The transmitted radio signal may however also be propagated and reflected by the external objects which may create a second component of the radio signal, herein referred to as a NLoS component. The NLoS component can be more dominant, such as have a higher receive power, than the LoS component and may thus be selected by the wireless device for positioning measurements. The usage of NLoS components of the transmitted radio signal may however compromise the performance of the positioning estimation, particularly timing based positioning estimation. This is because NLoS components typically experience larger propagation delays, thereby introducing a positive bias in the position estimates.

SUMMARY

Accordingly, there is a need for products (wireless node and network node) and methods performed therein for enabling positioning of a wireless device, which mitigate, alleviate or address the shortcomings existing and provide a higher accuracy positioning of the wireless device.

The current disclosure provides a method for improving accuracy of positioning by reducing NLoS components in a positioning measurement reporting. The NLoS components are reduced by identifying and/or quantifying the LoS and NLoS components from each base-station and prioritizing measurement results of LoS components when reporting the measurement report to the network.

A method is disclosed, performed by a first wireless node, for enabling positioning of the wireless device. The first wireless node provides, such as transmits, to a network node, a measurement report comprising a positioning measurement based on one or more reference signals transmitted from one or more second wireless nodes. The measurement report comprises an indication as to whether the positioning measurement is performed on a LoS component of the one or more reference signals.

Further, a wireless node is provided, the wireless node comprising a memory module, a processor module, and a wireless interface. The wireless node is configured to perform any of the methods disclosed herein in relation to the first wireless node.

The disclosed wireless node and related method enable a higher accuracy positioning of the wireless device by identifying and prioritizing LoS components of measured reference signals in the measurement report. By identifying and prioritizing LoS components, the number of NLoS components used for positioning may be reduced which reduces timing errors and improves positioning accuracy.

Further a method is disclosed, performed by a network node in a communications network, for positioning a wireless device. The network node obtains a measurement report comprising a positioning measurement, performed by the first wireless node, on reference signals received from one or more second wireless nodes. The measurement report comprises an indication as to whether the positioning measurement is performed on a LoS component of the reference signal. The network node further comprises determining, based on the measurement report, a location of the wireless device.

Further, a network node is provided, the network node comprising a memory module, a processor module, and an interface. The network node is configured to perform any of the methods any of the methods disclosed herein in relation to the network node.

It is an advantage of the disclosed network node and related method that a higher accuracy positioning of the wireless device is provided. NLoS components comprised in positioning measurement reports may be reduced, by identifying and prioritizing LoS components of measured reference signals. The positioning of the wireless device can thus be performed based on LoS components rather than NLoS components which reduces timing errors and thereby increases the positioning accuracy of the wireless device.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
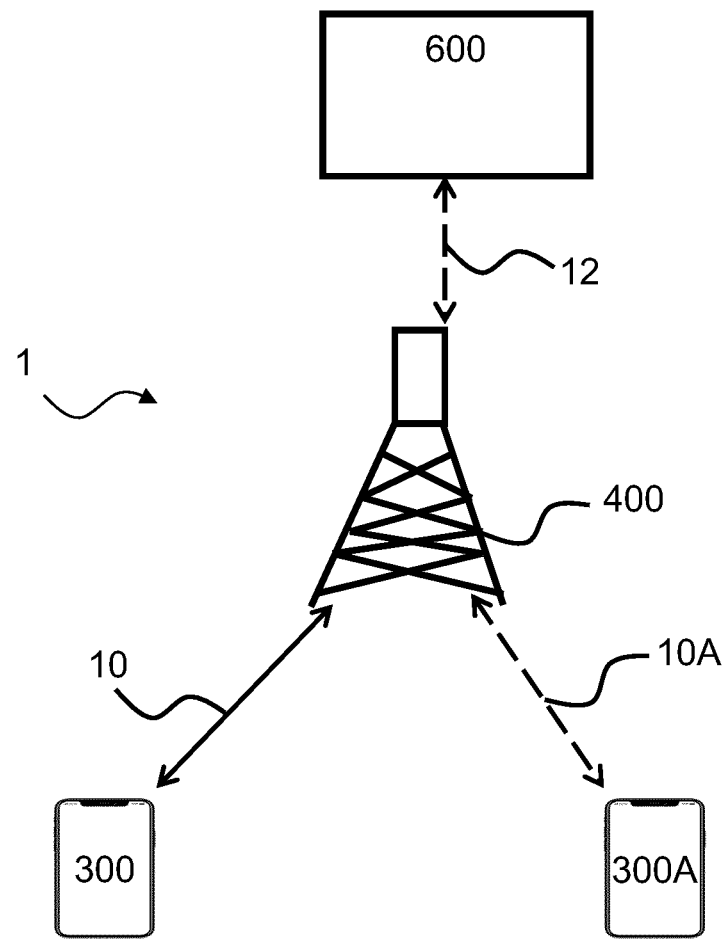
FIG. 1 is a diagram illustrating an exemplary wireless communication system comprising an exemplary network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an exemplary wireless communication system 1 comprising an exemplary base station 400 and an exemplary wireless device 300 according to this disclosure.

As discussed in detail herein, the present disclosure relates to a wireless communication system 1 comprising a cellular system, e.g. a 3GPP wireless communication system. The wireless communication system 1 comprises a wireless device (WD) 300, a base station 400 and a network node 600.

A base station 400 disclosed herein may refer to a radio access network node operating in the radio access network, such as an evolved Node B (eNB) or a 5G radio access network node referred to as gNB. Depending on the operating carrier frequency, a gNB may be operated with single or multiple beam transmission. Single beam is often referred as omni-directional transmission and used in lower frequencies (e.g. Frequency Range 1 in 5G New Radio). Multiple beam is typically used in Frequency Range 2 (FR2) (24 GHz and above) in order to compensate path-loss.

The wireless communication system 1 described herein may comprise one or more wireless devices 300, 300A, and/or one or more base stations 400, such as one or more of: a base station, an eNB, a gNB and/or an access point. The wireless communication system 1 may be arranged in an indoor and/or an outdoor environment. Depending on the operating carrier frequency, the one or more wireless devices may be operated with single or multiple beam transmission. Single beam is often referred as omni-directional transmission and used in lower frequencies (e.g. Frequency Range 1 in 5G New Radio). Multiple beam is typically used in Frequency Range 2 (FR2) (24 GHz and above) in order to compensate path-loss.

A network node 600 disclosed herein may refer to a core network node, such as a Location Server (LS) or evolved Serving Mobile Location Center (e-SMLC). In some embodiments the network node and the base station may be separate nodes or collocated nodes.

A wireless device 300 may refer to a mobile device and/or a user equipment (UE).

The wireless device 300, 300A may be configured to communicate with the base station 400 via a wireless link (or radio access link) 10, 10A. In the following the wireless device 300 and/or the base station 400 may be referred to as wireless nodes.

The network node 600 may be configured to communicate with the base station 400 and/or the wireless device 300, 300A via link 12.

Figure 2A:
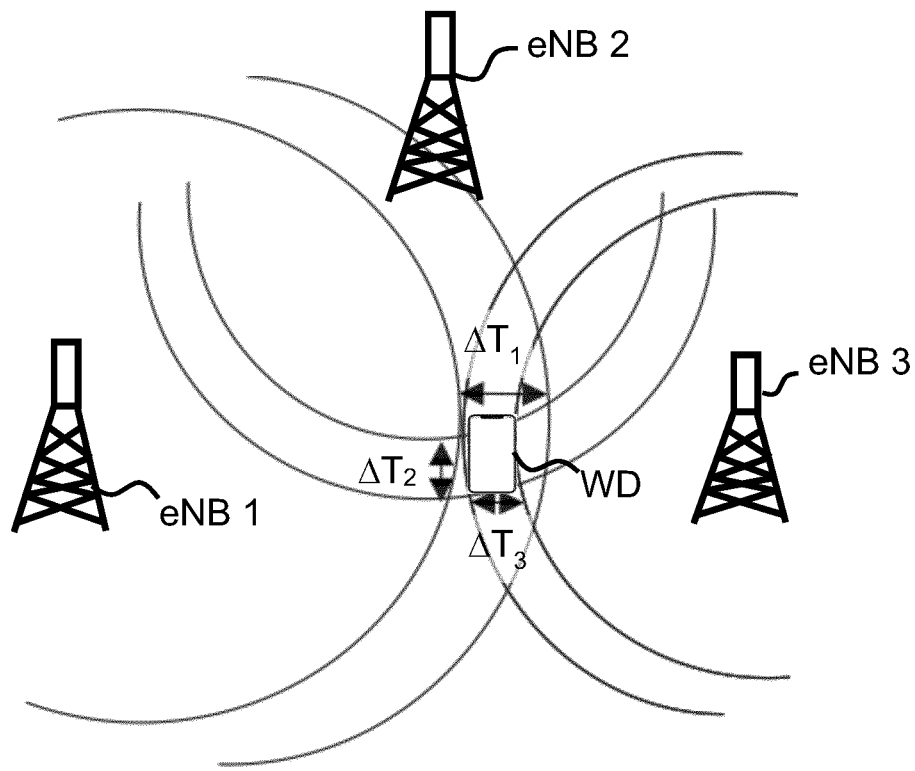
FIG. 2A is a diagram illustrating a known exemplary method for positioning measurement.

FIG. 2A discloses a common method for positioning a wireless device. Time Difference of Arrival (TDoA) is one of the common techniques used in radio-based positioning in wireless communication systems. A first wireless node, such as the wireless device WD (when positioning is performed in DL) or the base station (when positioning is performed in UL), receives reference signals transmitted by a second wireless node, such as the base station (when positioning is performed in DL) (such as an eNB and/or a gNBs) or the wireless device WD (when positioning is performed in UL), transmits reference signals. The reference signals may be dedicated reference signals configured to be used for positioning measurements, such as Positioning Reference Signals (PRSs). The reference signals may also be reference signals intended to assist communication, that may be used by the second wireless node, such as a wireless device or a base station, for positioning purposes (such as Synchronization Signal Block (SSB) or Channel State Information-Reference Signal (CSI-RS) for DL based positioning; or Sounding Reference Signal (SRS) or enhanced SRS for UL based positioning). The second wireless node performs Time of Arrival (ToA) measurements (positioning measurements) on the reference signals and reports the measurements to a network node, such as a LS. The network node performs a positioning estimation based on the reported measurement results. In order for the network node to perform the positioning estimation, multiple positioning measurements from various base stations, which may be referred to as multi-lateration, are required, as can be seen in FIG. 2A. In FIG. 2A an exemplary scenario is shown in which the positioning measurement is performed in DL. The WD, such as the UE, reports the positioning measurement to the network node (e.g. LS), in which LS computes the positioning estimate of the wireless device. The position of the wireless device may be determined by tri-lateration, e.g. by comparing the time of arrival at the wireless device of the signals transmitted from three different base stations, such as the base stations eNB 1, eNB 2 and eNB 3 shown in FIG. 2A. There may however be timing errors in each of the ToA measurements from the base stations, represented in FIG. 2A as ΔT, such as ΔT1, ΔT2, ΔT3, which may lead to an inaccurate or erroneous positioning estimation of the wireless device. There are many factors that may introduce timing errors, such as e.g. NLoS components of multipath transmissions. If the measurement is purely based on LoS components of the signals transmitted from the base stations, then the error is relatively small. The error may however be relatively large if the measurement is based on NLoS component as the signal may have been propagated and reflected on the path to the wireless device. Although FIG. 2A shows a scenario in which the positioning measurements are performed in the DL the same problem occurs during UL based positioning measurements. In this case the base stations perform positioning measurement based on a reference signal transmitted by the wireless device (e.g. SRS), and then the base stations eNB 1, eNB 2 and eNB 3 report the positioning measurement to the network node, such as the LS. LS computes the positioning estimate of the wireless device.

Figure 2B:
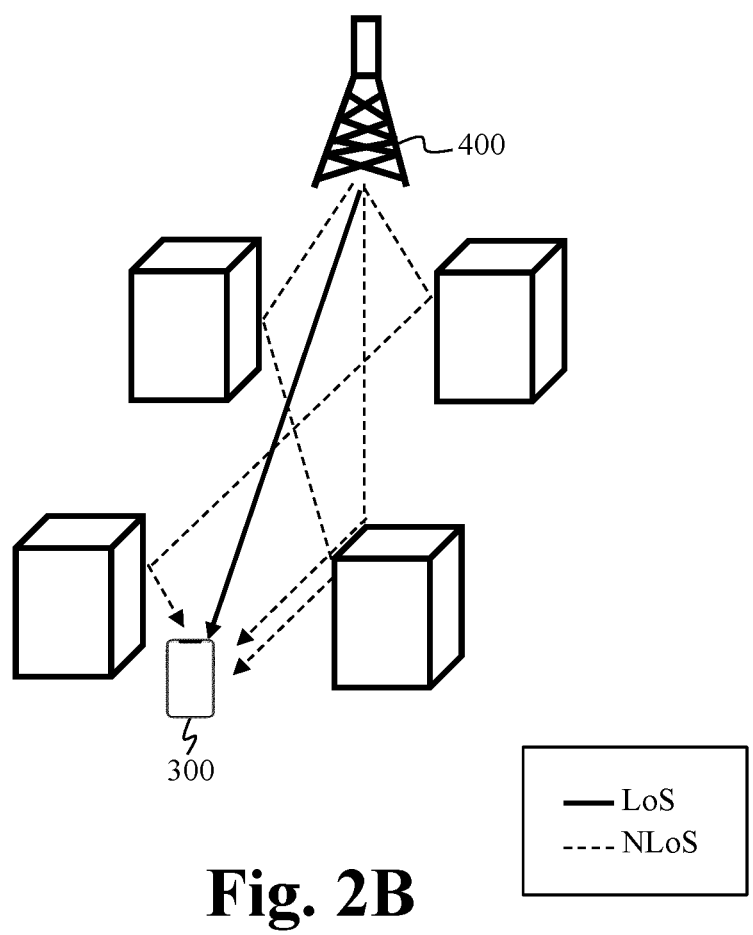
FIG. 2B is a diagram illustrating LoS and NLoS components of an exemplary multipath transmission.

FIG. 2B shows an illustration of a scenario in which reference signals transmitted to or from a wireless device are split up in LoS and NLoS components. A Line of Sight (LOS) component of a radio signal may herein be understood as a component of a radio signal transmitted to or from the wireless device 300 (from or to the base station 400) either in a straight line free of any form of obstruction, e.g. illustrated with a solid line in FIG. 2B, or as a radio signal transmitted in a straight line to the wireless device 300 through an obstructing material, but leaving sufficient transmission for radio waves to be detected. A NLoS component of a radio signal on the other hand is a component of the transmitted radio signals that is not a LoS component, i.e. a component that is not directly transmitted from/to the base station to/from the wireless device but is propagated and/or reflected by external objects illustrated by the blocks in FIG. 2B, such as e.g. metal objects in the indoor factory deployment. The NLoS components are for example illustrated with dashed lines in FIG. 2B. Hence, measurements based on NLoS components do not represent the true propagation time of the LoS between the base station and the wireless device. The timing error may become severe in indoor factory environments since the transmission paths may be obstructed by a large amount of metal objects, such as e.g. shelfs, walls and/or stored products.

The current disclosure provides a solution to the above-mentioned problem by introducing a procedure for detection and/or estimation of LoS components of the received reference signals at the receiver side, such as at the wireless device for DL positioning measurements and at the base station for UL positioning measurements, and its required signaling to enable the feature and measurement report procedure. For UL based positioning in which multiple base-stations receives the reference signal from the wireless device, each base-station performs a positioning measurement and reports its measurement to the network node, such as the LS. The reference signal may be a SRS or enhanced SRS, dedicated for positioning purpose.

Figure 3:
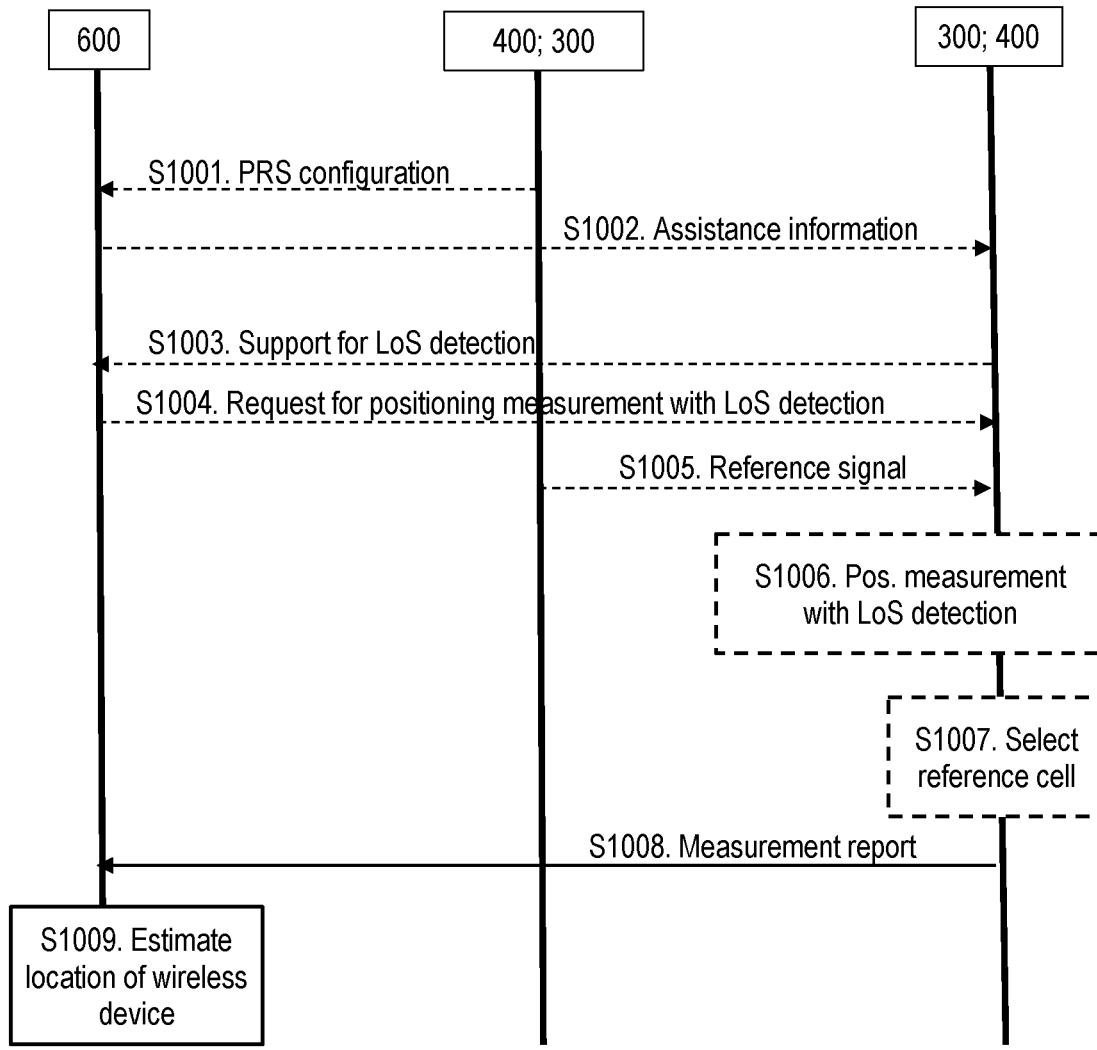
FIG. 3 is a signaling diagram illustrating an exemplary method, performed in a wireless communication system, for positioning of a wireless device according to this disclosure.

FIG. 3 discloses an exemplary signaling diagram for an example solution according to one or more embodiments of the current disclosure. The signaling diagram shows an overview of the signaling performed in the wireless communication network during DL based positioning, where the first wireless node is the wireless device 300 and the second wireless node is the base station 400. It shall however be noted that the signaling diagram also applies to UL based positioning, wherein the first wireless node is the base station 400 and the second wireless node is the wireless device 300. The actions performed by the wireless device 300 and the network node 600 are described in further detail in relation to FIGS. 4a, 4b and 5. It shall be noted the steps S1001-S1009 may be taken in any suitable order.

The base station 400, such as an eNB, gNB or transmit point (TP), may transmit S1001 its reference signal configuration, such as a Positioning Reference Signal (PRS) configuration, to the network node 600, such as the location server. The PRS configuration may comprise an information about a polarization, which may also be referred to as polarization information, of the PRSs transmitted from the base station 400. Polarization is a property of electromagnetic waves that specifies the direction of the oscillation of the electromagnetic field in the plane perpendicular to the direction of propagation of the wave, the polarization state. Attending to the shape of the trajectory described by the oscillation, the polarization state can be linear (e.g. vertical polarization or horizontal polarization), circular (e.g. clockwise or counterclockwise) or, in general, elliptical. During its travelling, the polarization state of an electromagnetic wave can change among these types, e.g. due to reflections with scattering objects in the environment. The polarization may e.g. change by a number of degrees from a horizontal polarization to a vertical polarization. The polarization information may indicate whether the polarization of the PRS is vertical, horizontal or circular. When the base station 400 is configured to transmit PRSs over a plurality of beams the polarization information may further indicate whether the polarization of the PRSs is the same for all beams, or whether each beam has its own polarization of the PRSs.

The network node 600 may provide S1002 assistance information to the wireless device 300, e.g. by transmitting the assistance information via the base station 400. In some embodiments the assistance information comprises reference signal configurations, such as PRS configurations, for one or more base stations in the wireless communication system. The reference signal configuration may indicate transmission parameters of the reference signals, such as BW, periodicity, resource (in time/frequency) configuration pattern, etc. The assistance information may further comprise an indication of a polarization of the reference signals transmitted from the one or more base stations. This action S1002 corresponds to the action S101 disclosed in relation to FIG. 4a and actions S201 disclosed in relation to FIG. 5.

The wireless device 300 may signal S1003 to the network node 600 an indication that it supports a determination of whether a reference signal is a LoS component. The wireless device 300 may thus be able to report its ability to perform LoS and/or NLoS detection for positioning as a capability. This action S1003 corresponds to the action S100 disclosed in relation to FIG. 4a and action S203 disclosed in relation to FIG. 5.

The network node 600 may send S1004 a positioning measurement request to the wireless device 300. The positioning measurement request may comprise a request to provide an indication of a LoS property, such as an indication as to whether the positioning measurement on a received PRS is performed based on a LoS or a NLoS component of the PRS. This action S1004 is similar to the action S103 disclosed in relation to FIG. 4a and the action S205 disclosed in relation to FIG. 5.

The base station 400 may transmit S1005 reference signals, such as PRS signals, to the wireless device 300. The reference signals may be broadcasted in a cell or over one or more transmit beams of the base station 400.

The wireless device 300 may perform S1006 positioning measurements on the one or more reference signals received from the one or more base stations. The wireless device 300 may further determine whether the reference signals are received over a LoS component of the reference signal or over a NLoS component of the reference signal, which may also be referred to as LoS detection. The positioning measurements may be e.g. ToA and/or Reference Signal Receive Power (RSRP). The determination of whether the PRS is received on a LoS or a NLoS component on the signal may be based on an analysis of measured statistical channel properties, such as a Ricean-K factor, an excess delay and/or power-based features. The wireless device may further estimate a quality of the LoS detection. The quality of the LoS detection may indicate a certainty that a LoS detection is correct. This action S1006 is similar to the actions S105 and S106 disclosed in relation to FIG. 4a.

The wireless device 300 may select S1007 a reference cell to be used for reporting ToA measurements, such as in a Reference Signal Time Difference (RSTD) report. Reference cell may be a serving cell or a cell that has met certain measurement criteria (e.g. satisfactory signal to noise ratio (SNR)). Furthermore, reference cell may also refer to a specific beam in a reference cell, such as a reference beam of a reference base station. The RSTD report indicates a time difference between reference signals from a plurality of base station and reports these time differences to the network node. In order to provide the RSTD report the wireless device needs to have a reference time of arrival in relation to which the time differences are reported. The reference time of arrival may be a time of arrival of a signal received from a reference cell. This action S1007 corresponds to the action S107 disclosed in relation to FIG. 4a.

The wireless device 300 provides S1008, to the network node 600, a measurement report comprising positioning measurements performed on one or more PRS received from the one or more base stations. The positioning measurements that are reported may be a subset of the measurements performed. The subset of the measurements to be reported may be determined by the wireless device 300 based on the quality of the LoS detection. By using the quality of LoS detection as a criterion for prioritizing the reports to the network node, the first wireless node improves the relevance of the reported measurement, more relevant shall herein be interpreted as contributing more to the accuracy of the positioning estimates. Furthermore, quality of LoS detection information may be used in an Artificial Intelligence (AI) or a Machine Learning (ML) based positioning estimation.

The measurement report may further comprise an indication indicating whether each of the reported measurements is performed on a LoS component. The measurement report may also comprise an indication of the quality of the LoS detection. An advantage with providing the indication of the quality is that, when multiple measurements are available, the network node may weigh the relative relevance of each measurement, thereby improving the estimation accuracy.

The measurement report may be provided to the network node 600 by transmitting the measurement report to the network node 600 via the base station 400. This action S1008 is similar to the actions S108, S109 and S111 disclosed in relation to FIG. 4b and the action S207 as disclosed in relation to FIG. 5.

When the network node 600 has received the measurement report from the wireless device 300 it estimates the position of the wireless device based on the measurement report. This step S1009 corresponds to the step S209 as disclosed in relation to FIG. 5.

Figure 4A:
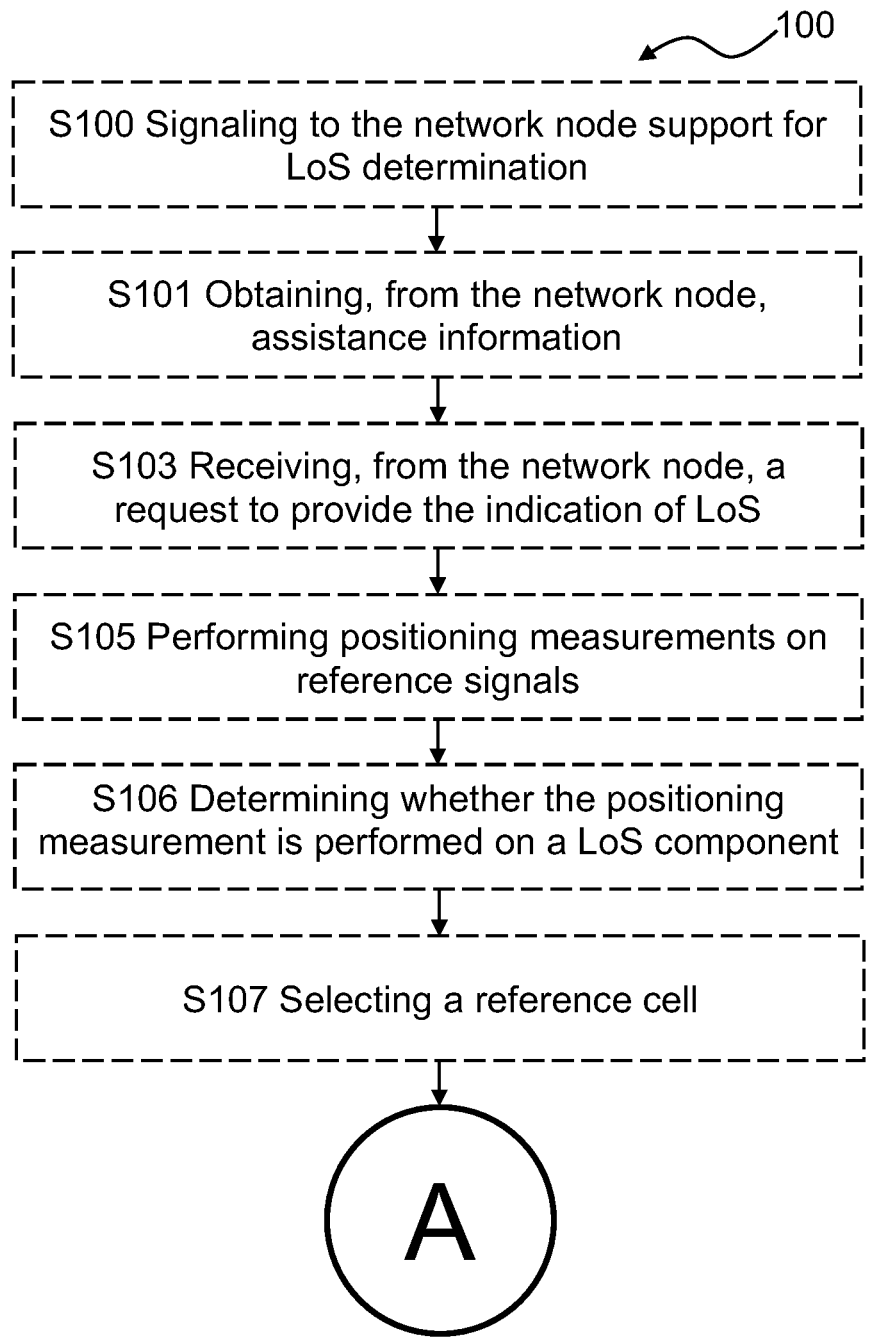
FIG. 4a-b are flow-charts illustrating an exemplary method, performed in a wireless device of a wireless communication system, for enabling positioning of the wireless device according to this disclosure.
Figure 4B:
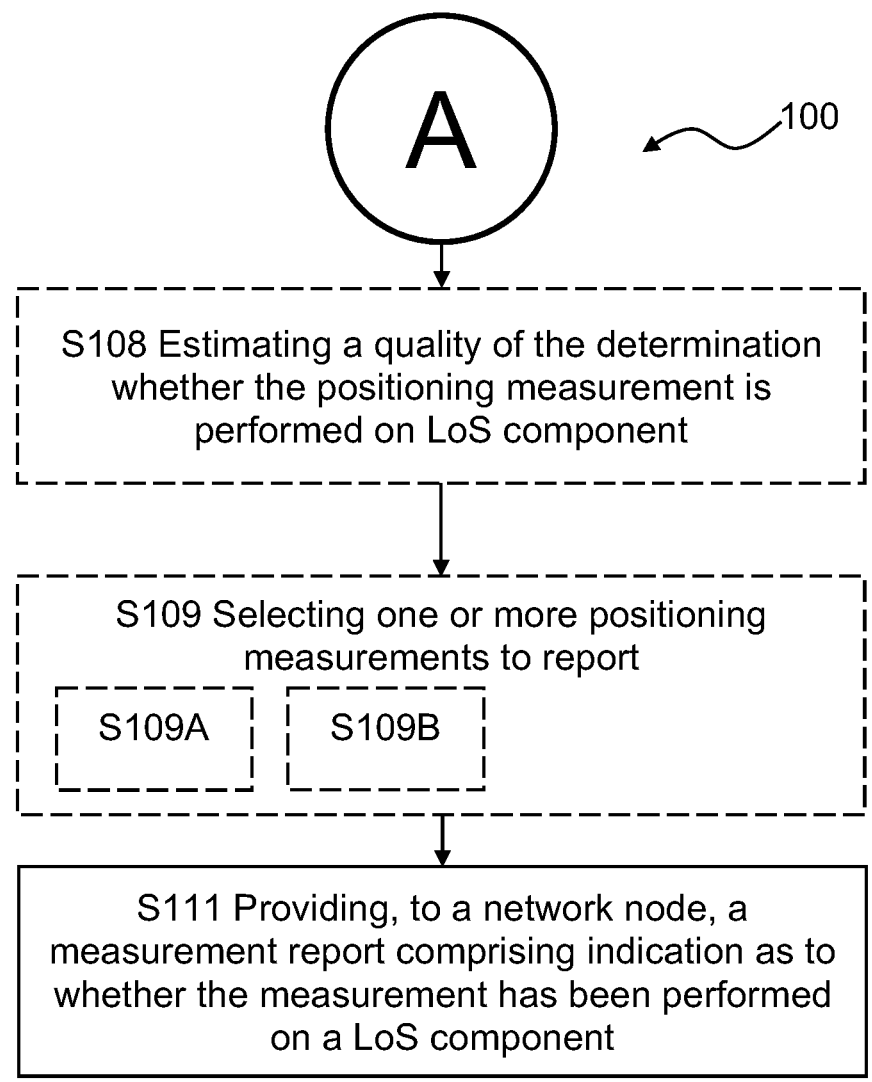

FIGS. 4a-4b show flow-charts of an exemplary method, performed by a first wireless node (such as the wireless device 300 for DL based positioning or the base station for UL based positioning), for enabling positioning of the wireless device according to the disclosure. The method 100 comprises providing S111, to a network node (such as a location server), a measurement report comprising a positioning measurement, such as a ToA and/or a RSRP measurement, based on one or more reference signals, such as PRSs, SSBs, CSI-RSs or SRSs, transmitted from one or more second wireless nodes (such as the wireless device 300 for UL based positioning or the base station for DL based positioning). The measurement report comprises an indication as to whether the positioning measurement is performed on a LoS component of the one or more reference signals. A Line of Sight (LOS) component of a radio signal may herein be understood as a component of a radio signal transmitted to or from the wireless device (from or to the base station) either in a straight line free of any form of obstruction, or as a radio signal transmitted in a straight line to the wireless device through an obstructing material, but leaving sufficient transmission for radio waves to be detected. A NLoS component of a radio signal on the other hand is a component of the transmitted radio signals that is not a LoS component, i.e. a component that is not directly transmitted from/to the base station to/from the wireless device but is propagated and/or reflected by external objects, such as e.g. metal objects in the indoor factory deployment.

The measurement report may be provided by the first wireless node to the network node by transmitting the measurement report directly to the network node (such as when the first wireless node is a base station) or transmitting the measurement report via a base station (such as when the first wireless node is the wireless device), such as transmitting the measurement report to the base station which forwards the measurement report to the network node. This action S109 is similar to the action S1008 disclosed in relation to FIG. 3 and is related to the action S207 as disclosed in relation to FIG. 5.

The measurement report may comprise an indication of a quality of a determination whether the positioning measurement is performed on the LoS component of the reference signal. The quality of the determination whether the positioning measurement is performed on the LoS component may herein also be referred to as LoS quality. The LoS quality indicates a certainty of the LoS determination, e.g. a probability of the LoS determination being correct, e.g. a confidence score.

The measurement report may comprise a path status field, to indicate whether a path, over which a reference signal is received, is LoS or NLoS. Furthermore, the path status field may be extended so that the wireless device can report the LoS quality. The LoS quality may be represented in, for example, two bits as shown in the following table:

| Bits | LoS Quality |
|------|-------------|
| 00 | Bad (very likely NLoS) |
| 01 | LoS with low confidence |
| 10 | LoS with medium confidence |
| 11 | LoS with strong confidence |

As can be seen in the table, the LoS quality may in this example be indicated in four different certainty levels, such as bad, low confidence, medium confidence or strong confidence. However, quantifications of the LoS/NLoS quality of a path are possible using any number of bits.

The method may comprise, prior to transmitting the measurement report, signaling S100 to the network node that the wireless device supports, such as is being configured for, determining whether a reference signal is a LoS component. This may be a regarded as wireless device capability signaling information. Not all wireless nodes may be configured for determining whether a received reference signal is received on a LoS component or a NLoS component and may thus not support detection or determination of LoS components. LoS detection may thus be an additional feature which may not be supported by all wireless nodes, such as legacy wireless nodes. Hence, the wireless device may report and/or signal whether it supports such operations or not. This action S100 corresponds to the action S1003 disclosed in relation to FIG. 3 and may relate to action S203 disclosed in relation to FIG. 5.

The method 100 may comprise obtaining S101, from the network node, assistance information for assisting the first wireless node in determining whether the received one or more reference signals are received as a LoS component. The assistance information may comprise a list of one or more wireless nodes, such as one or more base stations and/or one or more wireless devices, and a transmission configuration of the one or more wireless nodes, comprising e.g. their reference signal parameters, such as bandwidth (BW), periodicity, resource (in time/frequency) configuration pattern, etc. The assistance information, such as the transmission configuration, may comprise a polarization of the reference signals transmitted from the one or more base stations. The polarization may be a static polarization, such as: vertical, horizontal, or circular polarization. It may however also be a pattern that changes over time, such as: horizontal, vertical, horizontal, vertical, etc. This action S101 corresponds to the action S1002 disclosed in relation to FIG. 3 and may relate to action S203 disclosed in relation to FIG. 5.

The method may further comprise receiving S103, from the network node, a request to provide the indication as to whether the positioning measurement is performed on a LoS component of the reference signal in the measurement report. The request to provide the indication may be comprised in a request for performing positioning measurements. The network node, such as the location server, may request the first wireless node to provide the LoS status together with the positioning measurement results. The determination and/or detection of LoS components may thus be activated and/or deactivated based on signaling between the first wireless node and the network node. The network node may e.g. decide that it requires high accuracy positioning in a dense network where there may be a lot of NLoS components, while high accuracy positioning may not be required in a coarse network with less NLoS components.

Figure 5:
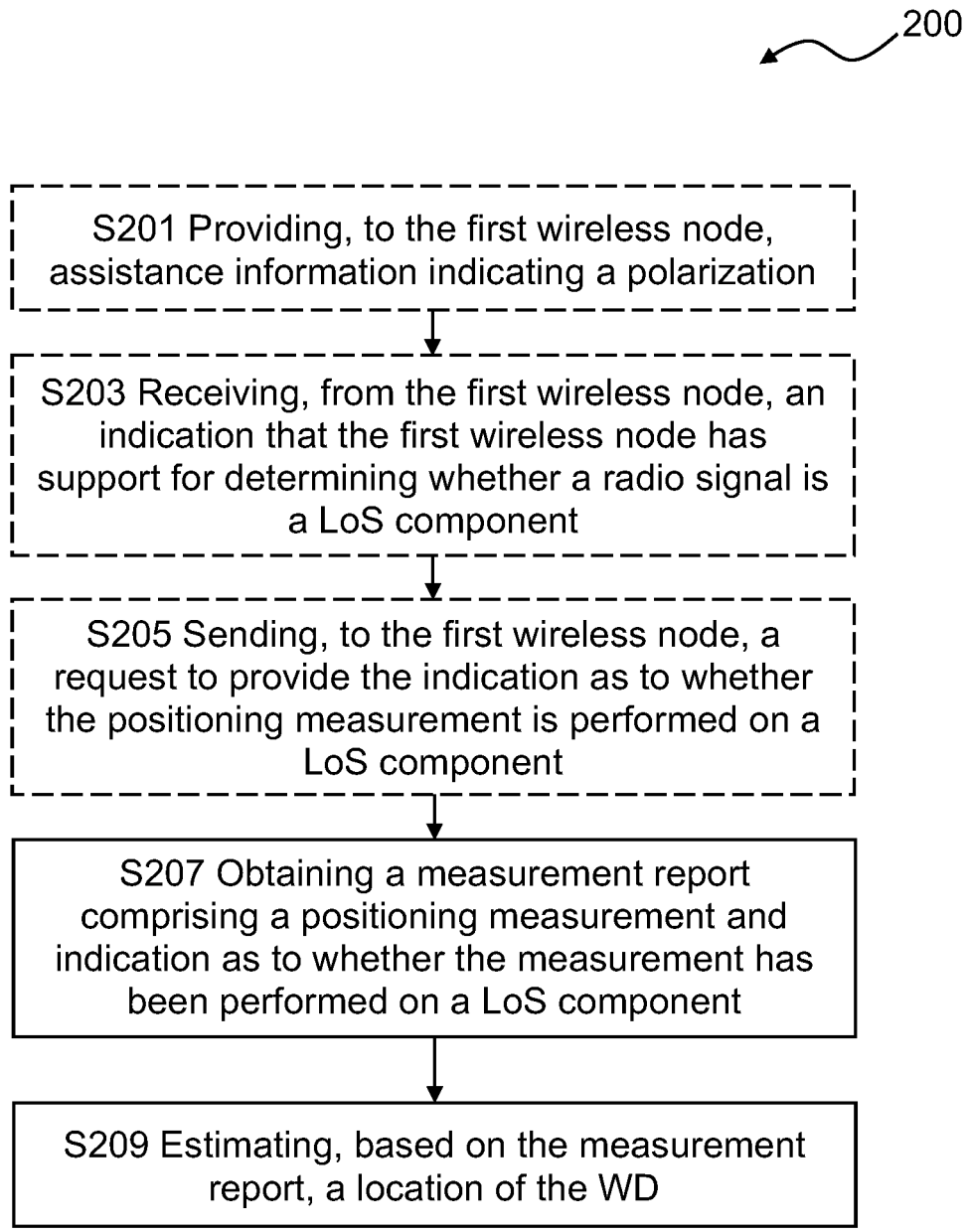
FIG. 5 is a flow-chart illustrating an exemplary method, performed in a network node of a wireless communication system, for positioning a wireless device according to this disclosure.

This action S103 is similar to the action S1004 disclosed in relation to FIG. 3 and relates to action S205 disclosed in relation to FIG. 5.

The method may further comprise performing S105 positioning measurements on one or more reference signals received from the one or more second wireless nodes. The positioning measurement may comprise a ToA and/or an RSRP measurement. This action S105 is similar to the action S1006 disclosed in relation to FIG. 3.

The method may further comprise determining S106 whether the positioning measurement is performed on a LoS component of the reference signal or on a NLoS component of the reference signal.

In some embodiments, the determining S106 may comprise determining whether certain channel properties, such as an excess delay, a K-Rician factor, and/or an energy of the multipath component on which the measured reference signal is received, or the distributions of these properties, are consistent with a propagation of a multipath component through LoS, or if they are consistent with NLoS propagation of the multipath component.

In some embodiments, the determining S106 may comprise determining whether a polarization of the received reference signal is different from a polarization of the reference signal transmitted by a corresponding base station. Radio signals are transmitted with a predetermined polarization, such as linear polarization (e.g. horizontal, or vertical), elliptical and/or circular polarization. The polarization of the transmitted signal may be provided to the first wireless node in the assistance information received from the network node. When a transmitted radio signal, such as a reference signal, is reflected by an external object, the polarization of the radio signal may change. The radio signal received at the first wireless node may therefore have a different polarization than the original radio signal transmitted from the second wireless node. Hence, when the first wireless node determines that the polarization of the received reference signal is different, such as has changed, by some threshold amount from the polarization of the reference signal transmitted by the corresponding second wireless node, the first wireless node may determine that the measured reference signal is not a LoS component. The threshold amount of polarization change may be predetermined. Correspondingly, when the first wireless node determines that the polarization of the received reference signal is not different, such as has not changed, within the threshold amount of polarization change from the polarization of the reference signal transmitted by the corresponding second wireless node, the first wireless node may determine that the measured reference signal is a LoS component. In some embodiments the first wireless node may determine that the polarization is different when the polarization of the received signal is substantially different than the polarization of the signal transmitted from the second wireless node. A difference may be substantial when the difference is above a certain predetermined threshold. The predetermined threshold may e.g. be a predetermined number of degrees that the polarization has changed. If the received signal only has a minor deviation around the polarization of the transmitted signal, the first wireless node may consider the polarization of the received signal as not being different from the polarization of the transmitted signal. In other words, the first wireless node may determine that the polarization of the received reference signal is different when it differs from the polarization of the transmitted signal by more than a predetermined polarization threshold. The difference in polarization may be used to estimate the quality of the LoS detection. For example, when the difference is large, such as above a quality threshold, then the quality indicator may be set to "bad". For example, when the difference is small, such as below the quality threshold then the quality indicator may be set to "high quality". The change in polarization may for example be from vertical to less vertical as there may be a deviation from the original polarization (such as some degrees). High confident determination of LoS, as shown in table 1, may be the case when the polarization is for example shifted equal to or less than e.g. +/−5 degrees. This action S106 is similar to the action S1006 disclosed in relation to FIG. 3.

The method may further comprise selecting S107 a reference cell, wherein the measurement report indicates a time difference of the measured reference signal in relation to the reference signal received from the reference cell. For example, a reference beam of reference base station may be selected. In one or more example embodiments, a reference wireless node may be selected. When the first wireless node performs timing-based reporting, such as when the measurement is based on ToA, the first wireless node may report the measurements in a RSTD report. The RSTD report indicates a time difference between reference signals from a plurality of second wireless nodes. The first wireless node reports these time differences to the network node. In order to provide the RSTD report the first wireless node needs to have a reference time of arrival in relation to which the time differences are reported. The reference time of arrival may be a time of arrival of a signal received from the reference cell. The first wireless node may select its serving cell or serving beam as the reference cell. In some embodiments however, the first wireless node may select the reference cell as the cell which provides the best LoS path estimation, such as has the highest LoS quality. The reference cell or may be selected based on the determination of whether the positioning measurement is performed on a LoS component of the reference signal, by selecting a cell corresponding to a positioning measurement performed over a LoS component over a cell corresponding to a Non-LoS component. The reference cell may in some embodiments be selected based on a quality of the determination whether the positioning measurement is performed on the LoS component of the reference signal, by selecting a cell corresponding to a positioning measurement having a higher-quality determination of a first LoS component over a positioning measurement having a lower-quality determination of a second LoS component. In other words, if the first wireless node determines that there is one reference signals received over a LoS component, such as over a LoS path, it may select the cell corresponding to that reference signal as the reference cell. If there are a plurality of reference signals received over a LoS component, such as over a LoS path, the wireless device may select the reference cell based on the quality of the LoS determination, where a reference signal having a higher LoS quality is selected over a reference signal having a lower LoS quality. This action S107 corresponds to the action S1007 disclosed in relation to FIG. 3.

The method may further comprise estimating S108 the quality of the determination whether the positioning measurement is performed on the LoS component of the reference signal. The quality of the determination may herein indicate a certainty of the measured reference signal being received on a LoS or NLoS component of the original signal. This action S108 is similar to the actions S1008 disclosed in relation to FIG. 3 and the action S207 as disclosed in relation to FIG. 5.

In some embodiments herein, the method may comprise selecting S109 one or more positioning measurements to report based on the determination of whether the positioning measurement is performed on a LoS component of the reference signal, by prioritizing the reporting of a positioning measurement based on a LoS component over a positioning measurement based on a NLoS component.

In some embodiments herein, the method, such as the selecting S109, may comprise selecting S109A one or more positioning measurements to report based on the quality of the determination whether the positioning measurement is performed on the LoS component of the reference signal. Reporting of a positioning measurement based on a higher-quality determination of a first LoS component may be prioritized over a positioning measurement based on a lower-quality determination of a second LoS component, wherein the quality of the higher-quality determination of the first LoS component is higher than the quality of the lower-quality determination of the second LoS component. In some embodiments herein, the method 100, such as the selecting S109, may comprise selecting S109B one or more positioning measurements to report based on a signal strength of the measured reference signal. These actions S109, S109A, S109B are similar to the actions S1008 disclosed in relation to FIG. 3 and may relate to action S207 as disclosed in relation to FIG. 5.

In a densified network, the first wireless node can see, such as receive reference signals from, a large number of second wireless nodes. It may be the case that nearby second wireless nodes, although they are close to the first wireless node and provide a high signal strength, are actually producing a lot of NLoS components. Hence, the positioning measurement report from the first wireless node may be populated with NLoS component from many second wireless nodes. Measurement reports are typically limited in the number of measurements that may be reported (e.g. measurements on up to N base-stations). Measurements of LoS components, although available to the first wireless node, may thus not be included in the measurement report since the signal strength from NLoS components may be higher and may thus never be seen by the LS. According to some of the embodiments herein however, the first wireless node may select the measurements to be reported by prioritization based on LoS component status, as opposed to merely based on signal strength (such as RSRP). The LoS-based prioritization may however also be combined with the signal strength results. For example, a strong RSRP and a high quality, such as strong confident, LoS component may be prioritized in the measurement report.

In some embodiments, the first wireless node may select the measurements to be included in the measurement report based on one or more thresholds, such as an RSRP threshold and/or a LoS quality threshold. The first wireless node may e.g. only select measurements where the measured LoS quality and/or measured RSRP exceeds the corresponding threshold. The one or more thresholds may be received from the network node or may be preconfigured in the first wireless node.

FIG. 5 shows a flow diagram of an exemplary method, performed by a network node, such as a location server, for positioning of a wireless device according to the disclosure. The method 200 comprises obtaining S207 a measurement report comprising a positioning measurement, performed by first wireless node, on reference signals received from one or more second wireless nodes. The measurement report comprises an indication as to whether the positioning measurement is performed on a LoS component of the reference signal. The measurement report may further comprise an indication of a quality of the indication as to whether the measurement is performed on a LoS component of the reference signal, which may also be referred to as a LoS quality indication. The LoS quality indicates a certainty of the LoS determination, i.e. a probability of the LoS determination being correct. This action S207 is similar to the actions S108, S109 and S111 disclosed in relation to FIG. 4 and the action S1008 as disclosed in relation to FIG. 3.

The method 200 further comprises estimating S209 a location of the wireless device based on the measurement report. The estimating S209 of the location of the wireless device may be based on the indication as to whether the positioning measurement is performed on the LoS component of the reference signal. For example, when the measurement report comprises a plurality of positioning measurements and the respective indication as to whether the respective positioning measurement is performed on a respective LoS component of the respective reference signal indicate that a first subset of the measurements have been performed on a respective LoS component and a second subset of the measurements have not been performed on a respective LoS component but rather on a respective NLoS component, the network node may estimate the location of the wireless device based on the first subset performed on the LoS components since these measurements are likely to have a smaller timing error. This action S209 corresponds to the step S1009 as disclosed in relation to FIG. 3.

The estimating S209 of the location of the wireless device may further be based on the indication of the quality of the indication as to whether the positioning measurement is performed on the LoS component of the reference signal. When the LoS quality indication is comprised in the measurement report, the network node may prioritize, or apply heavier weights to, measurements having a higher LoS quality indication over a measurement having a lower LoS quality.

The method 200 may further comprise providing S201, to the first wireless node, assistance information indicating a polarization of the reference signals transmitted from or to the wireless device. The polarization indication may be a beam specific indication. In case where the second wireless node is configured for multi-beam operation and transmits reference signals over multiple beams, such as for multi-beam operation, the multiple beams may all have the same polarization indication; or a beam or a group of beams may have its own polarization indication. In some embodiments, the network node may provide one or more thresholds to the first wireless node, wherein the one or more thresholds may be used for selecting the measurements to be included in the measurement report. The one or more thresholds may e.g. be an RSRP threshold and/or a LoS quality threshold. The wireless device may e.g. only be allowed to select measurements that have a measured LoS quality and/or measured RSRP that exceeds the corresponding threshold. The one or more thresholds may e.g. be comprised in the assistance information or in the request to provide the indication as to whether the positioning measurement is performed on a LoS component of the reference signal. This action S201 relates to action S101 disclosed in relation to FIG. 4a and actions S1002 disclosed in relation to FIG. 3.

The method 200 may further comprise receiving S203, from the first wireless node, an indication that the first wireless node supports determining whether a reference signal is a LoS component. This action S203 corresponds to the action S1003 disclosed in relation to FIG. 3 and relates to action S100 disclosed in relation to FIG. 4a.

The method 200 may further comprise sending S205, to the first wireless node, a request to provide the indication as to whether the positioning measurement is performed on a LoS component of the reference signal in the measurement report. The request to provide the indication as to whether the positioning measurement is performed on a LoS component of the reference signal may be sent based on the received indication that the first wireless node supports determining whether a reference signal is a LoS component. The determination and/or detection of LoS components may thus be activated and/or deactivated based on signaling between the first wireless node and the network node.

The request to provide the indication may be a positioning measurement request comprises an indication to perform LoS detection. The request to provide the indication may further comprise the one or more thresholds for selecting the measurements to be included in the measurement report, such as an RSRP threshold and/or a LoS quality threshold. This action S205 relates to the action S103 disclosed in relation to FIG. 4a and the action S1004 disclosed in relation to FIG. 3.

Figure 6:
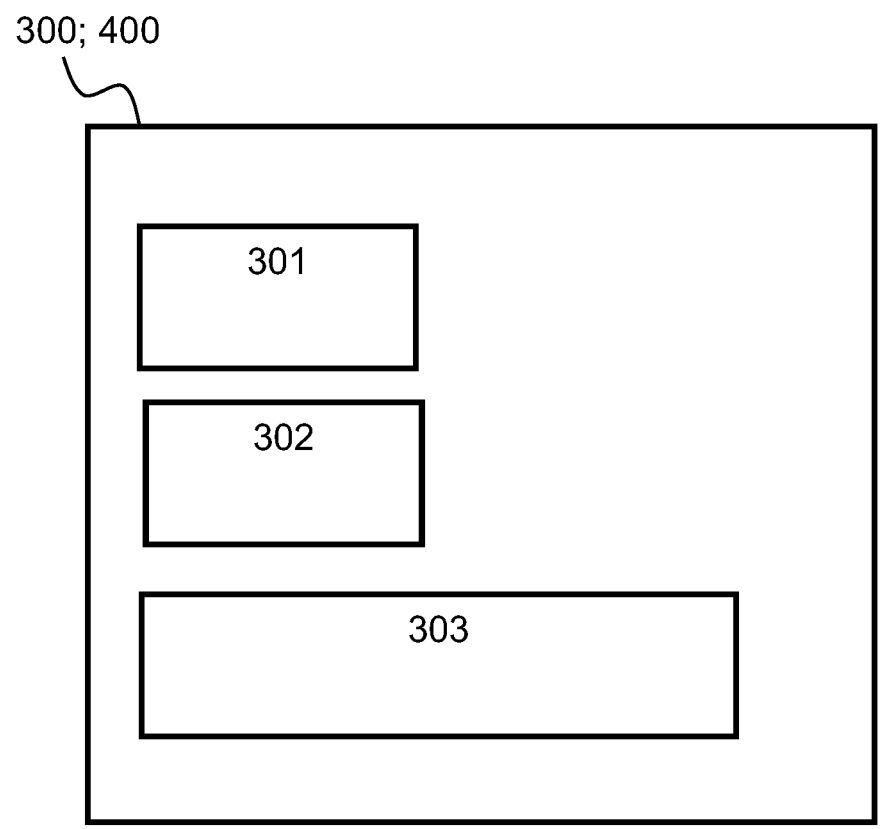
FIG. 6 is a block diagram illustrating an exemplary wireless device according to this disclosure.

FIG. 6 shows a block diagram of an exemplary first wireless node 300; 400 according to the disclosure. The first wireless node 300; 400 comprises memory circuitry 301, processor circuitry 302, and a wireless interface 303. The wireless device 300 may be configured to perform any of the methods disclosed in FIGS. 4a-4b. In other words, the first wireless node 300; 400 may be configured for enabling positioning of the wireless device.

The first wireless node 300; 400 is configured to communicate with a network node, such as the network node 600 disclosed herein, such as a location server, and/or with a second wireless node 400; 300, using a wireless communication system.

The wireless interface 303 is configured for wireless communications via a wireless communication system, such as a 3GPP system, such as a 3GPP system supporting New Radio (NR), supporting IoT, such as machine-type communications (MTC).

The first wireless node 300; 400 is configured to transmit, to the network node 600, a measurement report comprising a positioning measurement based on one or more reference signals transmitted from one or more second wireless nodes 400; 300, wherein the measurement report comprises an indication as to whether the positioning measurement is performed on a LoS component of the one or more reference signals. For DL positioning, where the first wireless node is the wireless device 300, the measurement report is transmitted to the network node 600 via a base station 400. For UL positioning, the wireless device 300 may be configured to transmit reference signals to one or more base stations 400, wherein each base-station 400 performs positioning measurements on the received reference signals and sends the measurement report to the network node 600. Hence, in UL, the wireless device is the second wireless node transmitting reference signals and the base station is the first wireless node receiving the reference signals and performing the positioning measurement.

The processor circuitry 302 is optionally configured to perform any of the operations disclosed in FIG. 4a-4b (such as any one or more of S100, S101, S103, S105, S106, S107, S108, S109). The operations of the first wireless node 300; 400 may be embodied in the form of executable logic routines (e.g. lines of code, software programs, etc.) that are stored on a non-transitory computer readable medium (e.g. the memory circuitry 301) and are executed by the processor circuitry 302).

Furthermore, the operations of the first wireless node 300; 400 may be considered a method that the first wireless node 300; 400 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 6). The memory circuitry 301 is considered a non-transitory computer readable medium.

The memory circuitry 301 may be configured to store assistance information, polarizations, and/or measurement results in a part of the memory.

Figure 7:
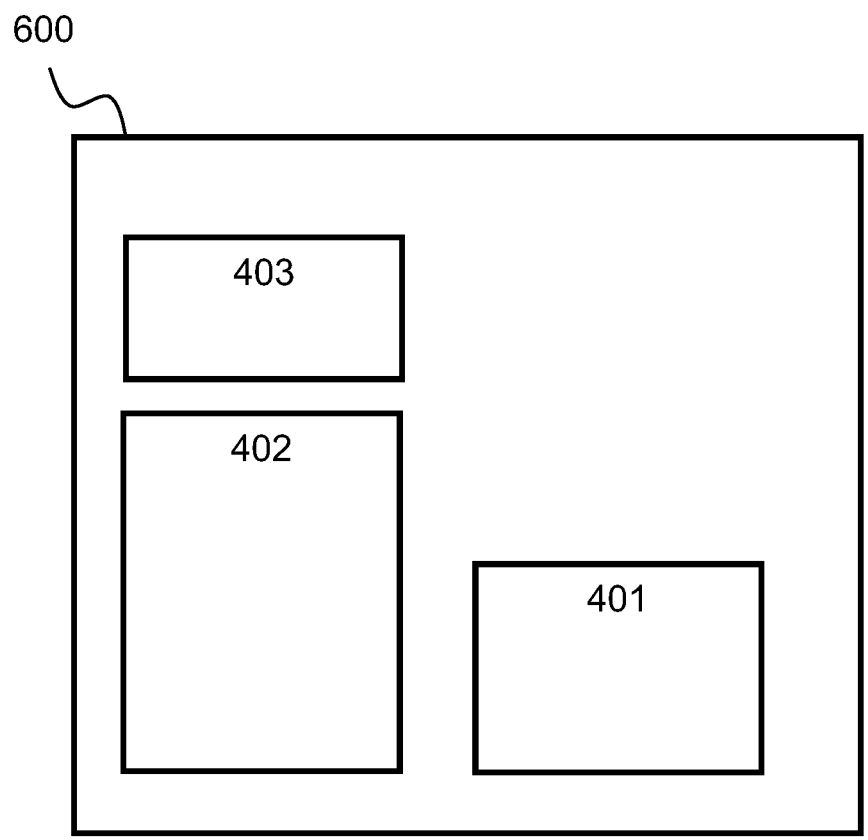
FIG. 7 is a block diagram illustrating an exemplary network node according to this disclosure.

FIG. 7 shows a block diagram of an exemplary network node 600, such as a location server, according to the disclosure. The network node 600 comprises memory circuitry 401, processor circuitry 402, and an interface 403. The network node 600 may be configured to perform any of the methods disclosed in FIG. 5. In other words, the network node 600 may be configured for positioning a wireless device.

The interface 403 is configured for communicating with a first wireless node, such as a base station and/or any network entities in a core network. The interface 403 may comprise a physical interface which may be a cable and/or a fiber optic connection.

The network node 600 is configured to obtain a measurement report comprising a positioning measurement, performed by the first wireless node 300; 400, on reference signals received from one or more second wireless nodes 400; 300, wherein the measurement report comprises an indication as to whether the positioning measurement is performed on a Line of Sight, LoS, component of the reference signal. The network node 600 is further configured to determine, based on the measurement report, a location of the wireless device 300. The network node 600 may be configured to send a request to the first wireless node, such as base-station 400, to send the positioning configuration to the network node 600. The network node 600 is configured to receive the positioning configuration from one or more first wireless nodes, such as one or more base-stations 400.

The processor circuitry 402 is optionally configured to perform any of the operations disclosed in FIG. 5 (such as any one or more of S201, S203, S205). The operations of the network node 600 may be embodied in the form of executable logic routines (e.g. lines of code, software programs, etc.) that are stored on a non-transitory computer readable medium (e.g. the memory circuitry 401) and are executed by the processor circuitry 402).

Furthermore, the operations of the network node 600 may be considered a method that the network node 600 is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or other suitable device. In a typical arrangement, the memory circuitry 401 may include a non-volatile memory for long term data storage and a volatile memory that functions as system memory for the processor circuitry 402. The memory circuitry 401 may exchange data with the processor circuitry 402 over a data bus. Control lines and an address bus between the memory circuitry 401 and the processor circuitry 402 also may be present (not shown in FIG. 7). The memory circuitry 401 is considered a non-transitory computer readable medium.

The memory circuitry 401 may be configured to store assistance information, polarizations, and/or measurement results in a part of the memory.

Embodiments of methods and products (network node and wireless node) according to the disclosure are set out in the following items:

Item 1. A method, performed by a first wireless node (300; 400) for enabling positioning of a wireless device, the method comprising:
  providing (S111), to a network node, a measurement report comprising a positioning measurement based on one or more reference signals transmitted from one or more second wireless nodes (400; 300), wherein the measurement report comprises an indication as to whether the positioning measurement is performed on a Line of Sight, LoS, component of the one or more reference signals.

Item 2. The method according to Item 1, wherein the method comprises:
  performing (S105) positioning measurements on one or more reference signals received from the one or more second wireless nodes (400; 300).

Item 3. The method according to Item 2, wherein the positioning measurement comprises a Time of Arrival, ToA, and/or a Reference Signal Receive Power, RSRP, measurement.

Item 4. The method according to any one of the Items 1 to 3, wherein the method comprises:
  determining (S106) whether the positioning measurement is performed on a LoS component of the reference signal.

Item 5. The method according to Item 4, wherein the determining (S106) is based on an analysis of one or more statistical properties of a channel over which the reference signal is transmitted, such as whether one or more channel properties of the received reference signals are consistent with a propagation of a LoS component or a NLoS component.

Item 6. The method according to Item 4 or 5, wherein the determining (S106) comprises:
  determining whether a polarization of the received reference signal is different from a polarization of the reference signal transmitted by a corresponding second wireless node (400; 300);
  when it is determined that the polarization of the received reference signal is different from the polarization of the reference signal transmitted by the corresponding second wireless node (400; 300), determining that the measured reference signal is not a LoS component;
  when it is determined that the polarization of the received reference signal is not different from the polarization of the reference signal transmitted by the corresponding second wireless node (400; 300), determining that the measured reference signal is a LoS component.

Item 7. The method according to any of the Items 4-6, wherein the measurement report comprises an indication of a quality of a determination whether the positioning measurement is performed on the LoS component of the reference signal.

Item 8. The method according to Item 7, wherein the method further comprises:
estimating (S108) the quality of the determination whether the positioning measurement is performed on the LoS component of the reference signal.

Item 9. The method according to any one of the Items 4 to 8, wherein the method further comprises:
selecting (S109) one or more positioning measurements to report, based on the determination of whether the positioning measurement is performed on a LoS component of the reference signal, by prioritizing the reporting of a positioning measurement based on a LoS component over a positioning measurement based on a NLoS component.

Item 10. The method according to Item 9 when dependent on Item 7 or 8, wherein the selecting (S109) comprises:
selecting (S109A) the one or more positioning measurements based on the quality of the determination whether the positioning measurement is performed on the LoS component of the reference signal, by prioritizing the reporting of a positioning measurement based on a higher-quality determination of a first LoS component over a positioning measurement based on a lower-quality determination of a second LoS component, wherein the quality of the higher-quality determination of the first LoS component is higher than the quality of the lower-quality determination of the second LoS component.

Item 11. The method according to Item 9 or 10, wherein the selecting (S109) comprises selecting (S109B) the one or more positioning measurements to report based on a signal strength of the measured reference signal.

Item 12. The method according to any one of the Items 1 to 11, wherein the method comprises:
obtaining (S101), from the network node (600), assistance information for assisting the second wireless node (400; 300) in determining whether the received one or more reference signals are received as a LoS component.

Item 13. The method according to Item 12, wherein the assistance information comprises a transmission configuration of the one or more second wireless nodes (400; 300), wherein the transmission configuration comprises a polarization of the reference signals transmitted from the one or more second wireless nodes (400; 300).

Item 14. The method according to any one of the Items 1 to 13, wherein the method further comprises:
selecting (S107) a reference cell, wherein the measurement report indicates a time difference of the measured reference signal in relation to the reference signal received from the reference cell.

Item 15. The method according to Item 14, wherein the reference cell is selected based on the determination of whether the positioning measurement is performed on a LoS component of the reference signal, by selecting a cell corresponding to a positioning measurement performed over a LoS component over a cell corresponding to a Non-LoS component; and/or based on a quality of the determination whether the positioning measurement is performed on the LoS component of the reference signal, by selecting a cell corresponding to a positioning measurement having a higher-quality determination of a first LoS component over a positioning measurement having a lower-quality determination of a second LoS component.

Item 16. The method according to any one of the Items 1 to 15, wherein the method further comprises:
signalling (S100) to the network node that the first wireless node (300; 400) supports determining whether a reference signal is a LoS component.

Item 17. The method according to any one of the Items 1 to 16, wherein the method further comprises:
receiving (S103), from the network node, a request to provide the indication as to whether the positioning measurement is performed on a LoS component of the reference signal in the measurement report.

Item 18. The method according to any one of the Items 1 to 17, wherein the first wireless node is a wireless device (300) and the second wireless node is a base station (400).

Item 19. The method according to any one of the Items 1 to 17, wherein the first wireless node is a base station (400) and the second wireless node is a wireless device (300).

Item 20. A method, performed by a network node in a communications network, for positioning a wireless device, the method comprising:
obtaining (S207) a measurement report comprising a positioning measurement, performed by a first wireless node (300; 400), on reference signals received from one or more second wireless nodes (400; 300), wherein the measurement report comprises an indication as to whether the positioning measurement is performed on a Line of Sight, LoS, component of the reference signal;
estimating (S209), based on the measurement report, a location of the wireless device (300).

Item 21. The method according to Item 20, wherein the estimating (S209) of the location of the wireless device (300) is based on the indication as to whether the positioning measurement is performed on the LoS component of the reference signal.

Item 22. The method according to any of Items 20-21, wherein the measurement report comprises an indication of a quality of the indication as to whether the positioning measurement is performed on a LoS component of the reference signal.

Item 23. The method according to Item 22, wherein the estimating (S209) of the location of the wireless device (300) is based on the indication of the quality of the indication as to whether the positioning measurement is performed on the LoS component of the reference signal.

Item 24. The method according to any one of the previous Items 20 to 23, wherein the method comprises:
providing (S201), to the first wireless node (300; 400), assistance information indicating a polarization of the reference signals transmitted from the one or more second wireless nodes (400; 300).

Item 25. The method according to any one of the previous Items 20 to 24, wherein the method further comprises:
receiving (S203), from the first wireless node (300; 400), an indication that the first wireless node (300; 400) has support for determining whether a reference signal is a LoS component.

Item 26. The method according to any of the previous Items 20 to 25, wherein the method further comprises:
sending (S205), to the first wireless node (300; 400), a request to provide the indication as to whether the positioning measurement is performed on a LoS component of the reference signal in the measurement report.

Item 27. The method according to any one of the Items 20 to 26, wherein the estimating of the location of the wireless device is based on a first subset of measurements performed on LoS components.

Item 28. The method according to any one of the Items 20 to 27, wherein the first wireless node is a wireless device (300) and the second wireless node is a base station (400).

Item 29. The method according to any one of the Items 20 to 27, wherein the first wireless node is a base station (400) and the second wireless node is a wireless device (300).

Item 30. A wireless node comprising a memory module, a processor module, and a wireless interface, wherein the wireless device is configured to perform any of the methods according to any one of Items 1-19.

Item 31. A network node comprising a memory module, a processor module, and an interface, wherein the network node is configured to perform any of the methods according to any of Items 20-29.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-7 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A method, performed by a first wireless node, for enabling positioning of a wireless device, the method comprising:
providing, to a network node, a measurement report comprising a positioning measurement based on one or more reference signals transmitted from one or more second wireless nodes, wherein the measurement report comprises an indication as to whether the positioning measurement is performed on a Line of Sight (LoS) component of the one or more reference signals, and
wherein the measurement report comprises an indication of a quality of a determination whether the positioning measurement is performed on the LoS component of the reference signal.

2. The method according to claim 1, wherein the method comprises:
performing positioning measurements on one or more reference signals received from the one or more second wireless nodes.

3. The method according to claim 2, wherein the positioning measurement comprises a Time of Arrival (ToA) and/or a Reference Signal Receive Power (RSRP) measurement.

4. The method according to claim 1, wherein the method comprises:
determining whether the positioning measurement is performed on a LoS component of the reference signal.

5. The method according to claim 4, wherein the determining is based on an analysis of one or more statistical properties of a channel over which the reference signal is transmitted, such as whether one or more channel properties of the received reference signals are consistent with a propagation of a LoS component or a non-LoS (NLoS) component.

6. The method according to claim 4, wherein the determining comprises:
determining whether a polarization of the received reference signal is different from a polarization of the reference signal transmitted by a corresponding second wireless node;
when it is determined that the polarization of the received reference signal is different from the polarization of the reference signal transmitted by the corresponding second wireless node, determining that the measured reference signal is not a LoS component;

when it is determined that the polarization of the received reference signal is not different from the polarization of the reference signal transmitted by the corresponding second wireless node, determining that the measured reference signal is a LoS component.

7. The method according to claim 1, wherein the method further comprises:

estimating the quality of the determination whether the positioning measurement is performed on the LoS component of the reference signal.

8. The method according to claim 4, wherein the method further comprises:

selecting one or more positioning measurements to report, based on the determination of whether the positioning measurement is performed on a LoS component of the reference signal, by prioritizing the reporting of a positioning measurement based on a LoS component over a positioning measurement based on a Non-Line of Sight (NLoS) component.

9. The method according to claim 8, wherein the measurement report comprises an indication of a quality of a determination whether the positioning measurement is performed on the LoS component of the reference signal and wherein selecting comprises:

selecting the one or more positioning measurements based on the quality of the determination whether the positioning measurement is performed on the LoS component of the reference signal, by prioritizing the reporting of a positioning measurement based on a higher-quality determination of a first LoS component over a positioning measurement based on a lower-quality determination of a second LoS component, wherein the quality of the higher-quality determination of the first LoS component is higher than the quality of the lower-quality determination of the second LoS component.

10. The method according to claim 8, wherein selecting comprises selecting the one or more positioning measurements to report based on a signal strength of the measured reference signal.

11. The method according to claim 1, wherein the method comprises:

obtaining, from the network node, assistance information for assisting the wireless device in determining whether the received one or more reference signals are received as a LoS component.

12. The method according to claim 11, wherein the assistance information comprises a transmission configuration of the one or more second wireless nodes, wherein the transmission configuration comprises a polarization of the reference signals transmitted from the one or more second wireless nodes.

13. The method according to claim 1, wherein the method further comprises:

selecting a reference cell, wherein the measurement report indicates a time difference of the measured reference signal in relation to the reference signal received from the reference cell.

14. The method according to claim 13, wherein the reference cell is selected based on the determination of whether the positioning measurement is performed on a LoS component of the reference signal, by selecting a cell corresponding to a positioning measurement performed over a LoS component over a cell corresponding to a NLoS component; and/or based on a quality of the determination whether the positioning measurement is performed on the LoS component of the reference signal, by selecting a cell corresponding to a positioning measurement having a higher-quality determination of a first LoS component over a positioning measurement having a lower-quality determination of a second LoS component.

15. The method according to claim 1, wherein the method further comprises:

signalling to the network node that the first wireless node supports determining whether a reference signal is a LoS component.

16. The method according to claim 1, wherein the method further comprises:

receiving, from the network node, a request to provide the indication as to whether the positioning measurement is performed on a LoS component of the reference signal in the measurement report.

17. The method according to claim 1, wherein the first wireless node is a wireless device, and the second wireless node is a base station.

18. The method according to claim 1, wherein the first wireless node is a base station, and the second wireless node is a wireless device.

19. A method, performed by a network node in a communications network, for positioning a wireless device, the method comprising:

obtaining a measurement report comprising a positioning measurement, performed by a one or more first wireless nodes, on reference signals received from one or more second wireless nodes, wherein the measurement report comprises an indication as to whether the positioning measurement is performed on a Line of Sight (LoS) component of the reference signal, and wherein the measurement report includes an indication of a quality of the indication as to whether the positioning measurement is performed on a LoS component of the reference signal; and estimating, based on the measurement report, a location of the wireless device.

* * * * *